United States Patent [19]

Proud

[11] 4,018,315
[45] Apr. 19, 1977

[54] INSULATED RUNNER FOR USE IN OVERHEAD ELECTRIC TRACTION SYSTEMS

[75] Inventor: Stanley Harold Russell Proud, Marlow, England

[73] Assignee: BICC Limited, London, England

[22] Filed: Dec. 30, 1975

[21] Appl. No.: 645,332

[30] Foreign Application Priority Data

Dec. 31, 1974 United Kingdom ............ 56248/74

[52] U.S. Cl. ................................. 191/39; 174/178; 238/150
[51] Int. Cl.[2] ..................... B60M 1/18; B60M 5/00
[58] Field of Search ............ 104/93, 106; 238/122, 238/134, 148, 150; 191/15, 39; 174/178, 179, 209

[56] References Cited

UNITED STATES PATENTS

| | | | |
|---|---|---|---|
| 2,997,529 | 8/1961 | Fink | 174/179 X |
| 3,952,848 | 4/1976 | Walker et al. | 191/39 X |

Primary Examiner—Stanley H. Tollberg
Attorney, Agent, or Firm—Buell, Blenko & Ziesenheim

[57] ABSTRACT

An insulated runner for use in an overhead electric traction system comprises at least one elongate reinforcing body of high tensile strength made wholly or substantially of insulating material, for example a rod of resin bonded glass fiber, and provided with metal terminal fittings, and at least one body of abrasion-resistant ceramic or vitreous material which is associated with, and extends lengthwise between the terminal fittings of, the reinforcing body and which provides an effective running surface. The outermost surface of the insulated runner between its terminal fittings is of an insulating material that is resistant to tracking. The abrasion-resistant body may enclose fully the part of the reinforcing body extending between the terminal fittings. Preferably, however, the reinforcing body and parts of the abrasion-resistant body are enclosed throughout their lengths by a body of a resin composition or other tracking-resistant material.

16 Claims, 5 Drawing Figures

INSULATED RUNNER FOR USE IN OVERHEAD ELECTRIC TRACTION SYSTEMS

This invention relates to insulated runners for use in overhead electric traction systems.

It is an object of the present invention to provide an improved insulated runner of composite form that is especially, but not exclusively, suitable for use in high speed overhead electric traction systems.

According to the present invention an improved insulated runner comprises at least one elongate body of high tensile modulus and high tensile strength made wholly of substantially of insulating material, hereinafter referred to as the reinforcing body, and provided with metal terminal fittings, and at least one elongate body of abrasion-resistant ceramic or vitreous material that is resistant to tracking, hereinafter referred to as the abrasion-resistant body, which is associated with, and extends lengthwise between the terminal fittings of, the reinforcing body or bodies and which provides an effective running surface, the outermost surface of the insulated runner between its terminal fittings being of an insulating material that is resistant to tracking.

By "tracking" is meant the formation on the surface of the insulated runner of thread-like tracks of carbon or other conducting material formed by breakdown of the insulating material due to the occurrence of electrical discharges across the insulated runner. The electrical stress required to initiate tracking varies according to the particular insulating material employed and it also varies according to the weather and the degree of atmospheric pollution, wet or icy conditions tending to cause earlier initiation of tracking.

The insulated runner of the present invention has the important advantage that risk of deterioration and possible failure of the reinforcing body or bodies due to contact by moisture is eliminated or at least substantially reduced and that at least one uninterrupted running surface is provided throughout substantially the whole of the length of the runner.

Preferably one or each reinforcing body is of resin-bonded fibre of high tensile strength, resin-bonded glass fibre currently being preferred. The or each abrasion-resistant body is preferably of, high alumina ceramic or vitreous ceramic.

The abrasion-resistant body or bodies may be of such a form as to enclose fully the part of the or each reinforcing body extending between the terminal fittings. Where, however, the or each abrasion-resistant body is of such a form and is so associated with the reinforcing body or bodies that a part or parts of at least one reinforcing body is exposed, preferably the exposed part or parts of the reinforcing body or bodies and, if desired, parts of the abrasion-resistant body or bodies is or are enclosed in a body of a resin composition or other material that is resistant to tracking.

The resin composition of the body enclosing the reinforcing and abrasion-resistant bodies is preferably a cycloaliphatic resin composition that is specially formulated to give a high resistance to tracking and to electrical erosion along any preferential path. Suitable plasticisers may be included to provide a degree of flexibility in the insulated runner. Another suitable material for enclosing the reinforcing and abrasion-resistant bodies is polytetrafluoroethylene.

Where, as is preferred, a single abrasion-resistant body is employed, preferably throughout its length it has a surface or surfaces of a shape and configuration complementary to the shape and configuration of a part of the surface of the or each reinforcing body so that the abrasion-resistant and reinforcing bodies can be in interfacial contact throughout the length of the abrasion-resistant body and may, if desired, be secured together by a suitable adhesive. Preferably the running surface of the abrasion-resistant body is, in transverse cross-section, of arcuate form; end parts of the running surface may be inclined upwardly to avoid presenting a sharp corner against which a current collector might strike.

Where, as is also preferred, a single reinforcing body is employed, this may be a rod of substantially circular cross-section or of a cross-section that has been flattened, e.g. to an oval or substantially rectangular cross-section. In the latter case the major transverse axis of the reinforcing body is preferably arranged substantially vertical when the insulated runner is incorporated in an overhead electric traction system. Alternatively, the single reinforcing body may be of a substantially channel-shaped cross-section and, in this case, a single abrasion-resistant body is housed between the side walls of the channel, the running surface being on a part of the abrasion-resistant body that protrudes from the open side of the channel. In a further embodiment the single reinforcing body may be replaced by two or more reinforcing bodies extending substantially parallel to one another.

The metal terminal fittings are preferably either compression jointed on to the ends of the reinforcing body or are secured thereto by one or more than one pin and preferably each consists of a tubular part of corrosion-resistant metal, into which one end of the reinforcing body fits, integral with a part suitable for making a mechanical connection to an end clamp for a contact wire. This part preferably consists of a tongue which can be attached between the limbs of a clevis end forming part of a contact wire clamp.

The undersurface of each terminal fitting in a transverse cross-section is preferably of arcuate form to provide a running surface for the current collector, the cross-sectional dimensions of the terminal fitting and the location of the bore into which the reinforcing body fits being such that said running surfaces of the terminal fittings, the running surface of the abrasion-resistant body and the running surfaces of the contact wires form a substantially smooth running surface throughout the length of the insulated runner.

For the purpose of sectionalising an overhead electric traction system it is the practice to insert section insulators in the system. These effectively insulate from one another the sections between which they are inserted, transmit the tension in the conductor or conductors in which they are inserted, and serve to transfer a current collector smoothly from the contact wire in one section across the section insulator to the contact wire in the next section. The present invention also includes a section insulator for an overhead electric traction system incorporating one or more than one insulated runner as hereinbefore described.

It is also the practice to separate two sections of overhead traction equipment which are supplied with alternating current and are connected to different substations, usually from different phases of the main supply system, by a section of equipment generally known as a neutral section. A neutral section may also be employed to separate two sections of overhead traction equipment which are supplied with direct circuit. The present invention further includes a neutral section incorporating one or more than one insulated runner as hereinbefore described.

The invention will be further illustrated by a description, by way of example, of four forms of insulated runner with reference to the accompanying drawing, in which.

Figure 1:
FIG. 1 is a diagrammatic sectional side view of an insulated runner.

The insulated runner shown in FIG. 1 consists of a composite elongate body 1 including an elongate reinforcing body 2 of resin bonded glass fibre. The ends of the elongate body 2 fit into blind bores in the tubular parts 4 of two metal terminal fittings 3 to which the elongate body is attached by compression joints. The tubular part 4 of each terminal fitting 3 is integral with a clevis 5 of substantially rectangular cross-section arranged with its slot substantially vertical. An end of a contact wire to be connected to the insulated runner will be terminated with an end clamp (not shown) formed with a tongue which will be attached by split dowel pins to the clevis 5 of the terminal fitting of the insulated runner.

Figure 2:
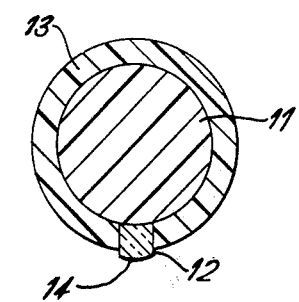
FIGS. 2 to 5 show cross-sectional end views of the composite elongate bodies of four insulated runners with the metal terminal fittings omitted.

Referring to FIG. 2, the composite elongate body comprises a rod 11 of substantially circular cross-section of resin-bonded glass fibre having metal terminal fittings (not shown) compression jointed to its ends. An elongate member 12 of vitreous material is bonded to the undersurface of the rod 11 throughout that part of the rod extending between the terminal fittings and a body 13 of cyclo-aliphatic resin containing polytetrafluoroethylene filler encloses the rod 11 and bears against the side faces of the member 12. The exposed undersurface 14 of the member 12 in a transverse cross-section is of arcuate form and with arcuate undersurfaces of the terminal fittings forms a runnng surface extending throughout the length of the insulated runner. Adjacent end parts of the undersurface 14 and of the undersurface of each terminal fitting are inclined upwardly to avoid risk of a sharp corner at the interface between the undersurface 14 and the undersurface of each metal terminal.

Figure 3:
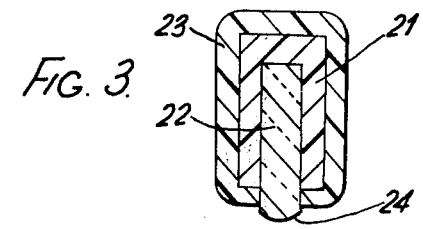

The composite elongate body shown in FIG. 3 comprises an elongate body 21 of substantially channel-shaped cross-section of resin-bonded glass fibre. Metal terminal fittings (not shown) are secured to the ends of the elongate body 21. An elongate member 22 of substantially rectangular cross-section made of vitreous material is housed between and bonded to the side walls of the elongate body 21. A part of the elongate member 22 protrudes from the open side of the channel-shaped body 21 and its under surface 24 in a transverse cross-section is of arcuate form and constitutes a running surface. The elongate body 21 and the exposed side faces of the member 12 are enclosed in a body 23 of cyclo-aliphatic resin containing polytetrafluoroethylene filler. The undersurface 24 of the member 22 and the under surfaces of the terminal fittings form a running surface extending throughout the length of the insulated runner.

Figure 4:
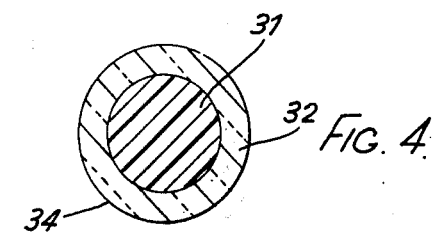

Referring to FIG. 4, the composite elongate body comprises a tube 32 of vitreous material which surrounds and is bonded to an elongate body 31 of resin-bonded glass fibre which protrudes from the ends of the tube. Metal terminal fittings (not shown) are compression jointed to the protruding ends of the elongate body 31. The undersurface 34 of the tube 32 combines with arcuate undersurfaces of the terminal fittings to form a substantially smooth running surface throughout the length of the insulated runner.

Figure 5:
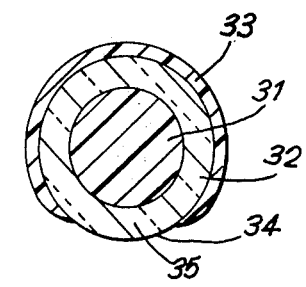

FIG. 5 shows a modification of the insulated runner illustrated in FIG. 4 in which a major portion of the periphery of the tube 32 of vitreous material is partially enclosed throughout its length by a body 33 of cyclo-aliphatic resin containing polytetrafluoroethylene filler to leave exposed an arcuate portion 35 whose undersurface 34 combines with arcuate undersurfaces of the terminal fittings to form a substantially smooth running surface throughout the length of the insulated runner.

What I claim as my invention is:

1. An insulated runner for use in an overhead electric traction system comprising at least one elongate reinforcing body of high tensile modulus and high tensile strength made at least substantially of insulating material and provided with metal terminal fittings, and at least one body of abrasion-resistant ceramic or vitreous material which is associated with, and extends lengthwise between the terminal fittings of, the reinforcing body and which provides an effective running surface, the outermost surface of the insulated runner between its terminal fittings being of an insulating material that is resistant to tracking.

2. An insulated runner as claimed in claim 1, wherein the running surface of the abrasion-resistant body is in transverse cross-section, of arcuate form.

3. An insulated runner as claimed in claim 1, wherein end parts of the running surface of the abrasion-resistant body are inclined upwardly.

4. An insulated runner as claimed in claim 1, wherein the reinforcing body is of resin bonded glass fibre.

5. An insulated runner as claimed in claim 1, wherein the metal terminal fittings are compression jointed to the ends of the reinforcing body.

6. An insulated runner as claimed in claim 1, wherein the undersurfaces of the metal terminal fittings and the running surface of the abrasion-resistant body form a substantially smooth running surface throughout the length of the insulated runner.

7. An insulated runner for use in an overhead electric traction system comprising at least one elongate reinforcing body of high tensile modulus and high tensile strength made at least substantially of insulating material and provided with metal terminal fittings; at least one body of abrasion-resistant ceramic or vitreous material which is associated with, and extends lengthwise between the terminal fittings of, the reinforcing body and which provides an effective running surface; and enclosing the reinforcing body and parts of the abrasion-resistant body throughout their lengths to leave exposed the running surface, a body of an insulating material that is resistant to tracking.

8. An insulated runner as claimed in claim 7, wherein the tracking-resistant material of the body enclosing the reinforcing body and parts of the abrasion-resistant body is a cyclo-aliphatic resin composition.

9. An insulated runner as claimed in claim 7, wherein the tracking-resistant material of the body enclosing the reinforcing body and parts of the abrasion-resistant body is polytetrafluoroethylene.

10. An insulated runner as claimed in claim 7 which includes a single abrasion-resistant body, wherein throughout its length the abrasion-resistant body has a surface of a shape and configuration complementary to the shape and configuration of a part of the surface of the reinforcing body so that the abrasion-resistant and reinforcing bodies are in interfacial contact throughout the length of the abrasion-resistant body.

11. An insulated runner as claimed in claim 10, wherein the abrasion-resistant and reinforcing bodies are secured together by an adhesive.

12. An insulated runner as claimed in claim 10, wherein the reinforcing body is of a substantially channel-shaped cross-section and the abrasion-resistant body is housed between the side walls of the channel, the running surface being on a part of the abrasion-resistant body that protrudes from the open side of the channel.

13. An insulated runner as claimed in claim 7, wherein a single abrasion-resistant body extends lengthwise between two reinforcing bodies that extends substantially parallel to one another.

14. An insulated runner as claimed in claim 7, wherein the reinforcing body is a rod of substantially circular cross-section.

15. An insulated runner as claimed in claim 7, wherein the reinforcing body is a rod of substantially rectangular cross-section.

16. An insulated runner for use in an overhead electric traction system comprising an elongate reinforcing member of high tensile modulus and high tensile strength made at least substantially of insulating material and provided with metal terminal fittings and, enclosing and in interfacial contact with that part of the reinforcing member extending between the terminal fittings a tubular body of abrasion-resistant and tracking-resistant ceramic or vitreous material which provides an effective running surface.

* * * * *

UNITED STATES PATENT OFFICE
CERTIFICATE OF CORRECTION

PATENT NO. : 4,018,315
DATED : April 19, 1977
INVENTOR(S) : STANLEY HAROLD RUSSELL PROUD It is certified that error appears in the above-identified patent and that said Letters Patent are hereby corrected as shown below:

In the Abstract, line 3, after "tensile" should read --modulus and high tensile--.

Column 1, line 42, "one" should read --the--.

Column 3, line 40, "runnng" should read --running--.

Column 3, line 56, "under surfaces" should read --undersurfaces--.

Column 3, line 62, "under surfaces" should read --undersurfaces--.

Signed and Sealed this second Day of August 1977

[SEAL]

Attest:

RUTH C. MASON
Attesting Officer

C. MARSHALL DANN
Commissioner of Patents and Trademarks